US012767247B2

(12) United States Patent
Saneholtz et al.

(10) Patent No.: US 12,767,247 B2
(45) Date of Patent: Oct. 20, 2026

(54) POROUS TRIP FOR UNDERBODY SHIELD

(71) Applicant: Ford Global Technologies, LLC, Dearborn, MI (US)

(72) Inventors: Laura Saneholtz, Berkley, MI (US); Michael Francois, Wyandotte, MI (US); Ricardo David Ortega del Angel, Iztapalapa (MX)

(73) Assignee: Ford Global Technologies, LLC, Dearborn, MI (US)

( * ) Notice: Subject to any disclaimer, the term of this patent is extended or adjusted under 35 U.S.C. 154(b) by 304 days.

(21) Appl. No.: 18/652,299

(22) Filed: May 1, 2024

(65) Prior Publication Data

US 2025/0340253 A1 Nov. 6, 2025

(51) Int. Cl.
*B62D 35/02* (2006.01)

(52) U.S. Cl.
CPC .................................... *B62D 35/02* (2013.01)

(58) Field of Classification Search
CPC ................................ B62D 35/02; B62D 37/02
See application file for complete search history.

(56) References Cited

U.S. PATENT DOCUMENTS 4,455,045 A 6/1984 Wheeler
6,435,298 B1 8/2002 Mizuno et al.
8,668,254 B2 * 3/2014 Onodera ................ B62D 35/02 180/69.1
9,227,677 B2 1/2016 Hillstroem et al.
9,469,355 B2 10/2016 Wolf
9,868,479 B2 * 1/2018 Shinedling ............. B62D 35/02
9,932,074 B2 4/2018 Sarhadiangardabad
11,390,335 B2 7/2022 Thomas et al.
11,447,192 B2 9/2022 Moradnia et al.
11,459,039 B2 10/2022 Matsushita et al.
11,548,571 B2 1/2023 Moradnia et al.
D981,300 S 3/2023 Thomas et al.
11,772,721 B2 10/2023 Wallrabe et al.
2007/0235590 A1 * 10/2007 Kokoshkin ............. B64C 21/10 244/130
2013/0026797 A1 1/2013 Onodera et al.
2015/0008698 A1 1/2015 Reisenhofer
2024/0367731 A1 * 11/2024 Kron ...................... B62D 35/02

FOREIGN PATENT DOCUMENTS

CN 110303994 B 8/2022

* cited by examiner

*Primary Examiner* — Huan Le
(74) *Attorney, Agent, or Firm* — Lorne Forsythe; Price Heneveld LLP

(57) ABSTRACT

An airflow management device for a vehicle underbody includes a plurality of protrusions, each having a leading face extending away from a base and narrowing to a peak positioned away from the major surface at a height of the protrusion and a trailing portion extending from the leading face to a trailing profile that tapers inwardly from the base of the leading face to a trailing point with a ridge extending from the peak of the leading face to the trailing point. The respective bases of the leading faces intersect to define a continuous lower face portion adjacent the major surface.

20 Claims, 10 Drawing Sheets

POROUS TRIP FOR UNDERBODY SHIELD

FIELD OF THE DISCLOSURE

The present disclosure generally relates to an airflow management device for use on a vehicle underbody. More particularly, the airflow management device is a porous trip useable to redistribute underbody airflow energy and balance rear vehicle wake to reduce drag.

BACKGROUND OF THE DISCLOSURE

There are three alternative designs typically used in automobile aerodynamics to control or influence flow from an underbody diffuser, including gurney flaps, strakes, and vortex generators. Gurney flaps are a single protrusion perpendicular to the shield and with a face normal to the flow direction. The flap will span the shield cross car in the Y-direction. The purpose of the Gurney flap is to balance the rear wake of the vehicle by creating a controlled and distinct shear layer from the diffuser. These also typically create downforce. Strakes are large, thin vertical walls in line with the flow used to straighten streamlines at the rear of the vehicle and control rear lift. Vortex generators are, typically, small thin protrusions used on the surface of an aircraft or other wetted surfaces to create controlled vortices and delay flow separation. They are spaced, shaped, and angled for that purpose.

SUMMARY OF THE DISCLOSURE

According to one aspect of the present disclosure, a vehicle underbody diffuser shield includes a body having a leading end and a trailing end, a major surface defining a portion of an underbody of the vehicle extending between the leading end and the trailing end, the major surface defining surface transition between the leading end and the trailing end such that the surface transition is positioned below the trailing end. A plurality of protrusions extend away from the major surface and arranged along a transverse axis of the body located between the surface transition and the trailing end. Each of the plurality of protrusions have a leading face extending away from the body at base aligned with the surface transition and narrowing to a peak positioned away from the major surface at a height of the protrusion and a trailing portion extending from the leading face toward the trailing end. The trailing portion intersects the major surface along an intersection profile that tapers inwardly from the base of the leading face to a trailing point disposed toward the trailing end of the body.

Embodiments of the first aspect of the invention can include any one or a combination of the following features:

- the respective bases of the leading faces can intersect to define a continuous lower face portion adjacent the major surface;
- the leading face of each of the plurality of protrusions can define opposite outer edges extending from the base to the peak, the outer edges being concave;
- the opposite outer edges can extend continuously between adjacent peaks in respective successive protrusions so as to define a scalloped profile extending through the plurality of protrusions;
- the trailing portion of each of the plurality of protrusions can define a concave surface extending rearwardly from each of the opposite outer edges, and the intersection profile can be parabolic along a portion defined by an intersection between each concave surface and the major surface of the body;
- the surface transition can induce a boundary layer separation of air flow over the major surface in a direction from the leading end to the trailing end, and the height of each of the plurality of protrusions is such that at least the peaks of the protrusions extend into the boundary layer;
- the plurality of protrusions can collectively direct the boundary layer away from the major surface of the body toward the trailing edge;
- the surface transition can be further positioned below the leading end such that an energy of an air flow over the major surface increases between the leading end and the surface transition, and the leading faces of the plurality of protrusions can reduce the air flow energy moving toward the trailing edge;
- the trailing portions can extend rearwardly and interact with the intersection profiles to collectively produce turbulent eddies within the air flow that are directed away from the major surface; and at least some of the protrusions can be molded into the diffuser shield with the body.

According to another aspect of the present disclosure, an airflow management device for a vehicle underbody includes a plurality of protrusions, each having a leading face extending away from a base and narrowing to a peak positioned away from the major surface at a height of the protrusion and a trailing portion extending from the leading face to a trailing profile that tapers inwardly from the base of the leading face to a trailing point with a ridge extending from the peak of the leading face to the trailing point. The respective bases of the leading faces intersect to define a continuous lower face portion adjacent the major surface.

According to another aspect of the present disclosure, an airflow management device for a vehicle underbody includes a plurality of protrusions, each having a leading face extending away from a base and narrowing to a peak positioned away from the major surface at a height of the protrusion and defining opposite outer edges extending from the base to the peak, the outer edges being concave and a trailing portion extending from the leading face to a trailing profile that tapers inwardly from the base of the leading face to a trailing point with a ridge extending from the peak of the leading face to the trailing point. The trailing portion defines a concave surface extending rearwardly from each of the opposite outer edges. The intersection profile is parabolic along a portion defined by an intersection between each concave surface and the major surface of the body.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
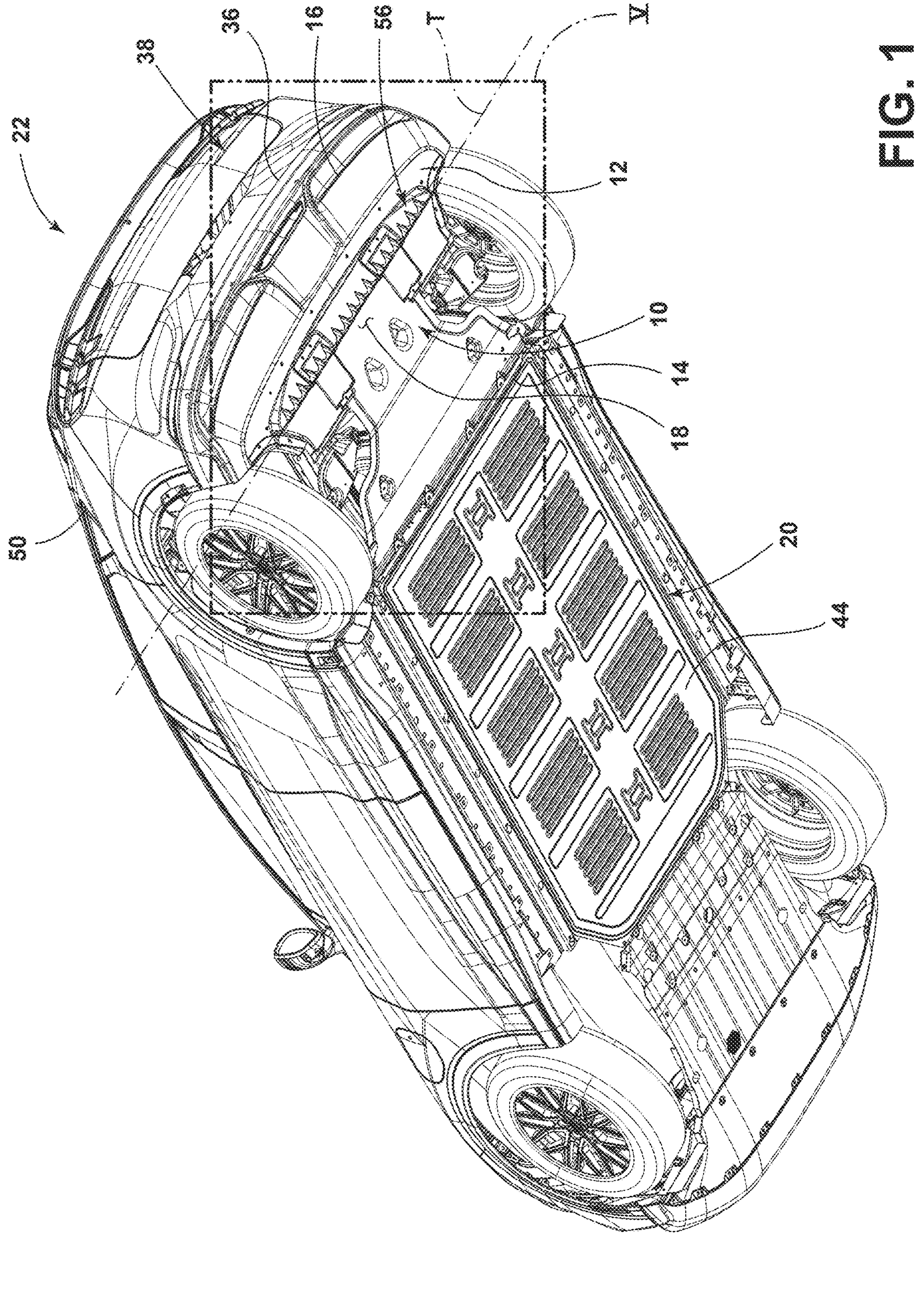
FIG. 1 is a bottom perspective view of a vehicle including a diffuser shield according to an aspect of the disclosure.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Ordinal modifiers (i.e., "first", "second", etc.) may be used to distinguish between various structures of the disclosed transportation rack in various contexts, but that such ordinals are not necessarily intended to apply to such elements outside of the particular context in which they are used and that, in various aspects different ones of the same class of elements may be identified with the same, context-specific ordinal. In such instances, other particular designations of the elements are used to clarify the overall relationship between such elements. Ordinals are not used to designate a position of the elements, nor do they exclude additional, or intervening, non-ordered elements or signify an importance or rank of the elements within a particular class.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the terms "about", "approximately", or "substantially" are intended to mean that a value of a parameter is close to a stated value or position. However, minor differences may prevent the values or positions from being exactly as stated. Thus, unless otherwise noted, differences of up to ten percent (10%) for a given value are reasonable differences from the ideal goal of exactly as described. In many instances, a significant difference can be when the difference is greater than ten percent (10%), except as where would be generally understood otherwise by a person of ordinary skill in the art based on the context in which such term is used.

Referring to FIG. 1, reference numeral 10 generally designates a vehicle underbody diffuser shield. The diffuser shield 10 includes a body 12 having a leading end 14 and a trailing end 16. A major surface 18 of the body 12 defines a portion of an underbody 20 of the vehicle 22 and extends between the leading end 14 and the trailing end 16. The major surface 18 defines surface transition 24 between the leading end 14 and the trailing end 16 such that the surface transition 24 is positioned below the trailing end 16. A plurality of protrusions 26 extend away from the major surface 18 and are arranged along a transverse axis T of the body 12 that is generally located between the surface transition 24 and the trailing end 16. Each of the plurality of protrusions 26 have a leading face 28 extending away from the body 12 at base 30 aligned with the surface transition 24 and narrowing to a peak 31 positioned away from the major surface 18 at a height H of the protrusion 26 and a trailing portion 32 extending from the leading face 28 toward the trailing end 16. The trailing portion 32 intersects the major surface 18 along an intersection profile 34 that tapers inwardly from the base 30 of the leading face 28 to a trailing point 68 disposed toward the trailing end 16 of the body 12.

Various types of vehicles include a diffuser shield 10 under the rear portion 38 of the vehicle 22, adjacent to and leading into the underside of the bumper 36 at the rear 38 of the vehicle. As can be appreciated, the shape of the diffuser shield 10 interacts with the upstream and downstream vehicle geometry to define a portion of the wake that results from forward driving of the vehicle 22 at speed. The wake of a vehicle 22 plays a role in causing drag in addition to that caused by the front end of the vehicle moving air outwardly. Generally speaking, wake is the region of disturbed airflow left behind the vehicle. It consists of chaotic and turbulent air patterns created by the passage of the vehicle through the surrounding air. The drag force acting on a vehicle 22 is directly related to the wake it produces in that the drag force depends on the pressure distribution within the wake. In one respect, the greater the "velocity defect" (the difference between the wake velocity and the incoming stream velocity), the more significant the drag force becomes. The lower the pressure within the wake, the more drag it causes. In this manner, increasing the pressure in the wake reduces drag.

Figure 2:
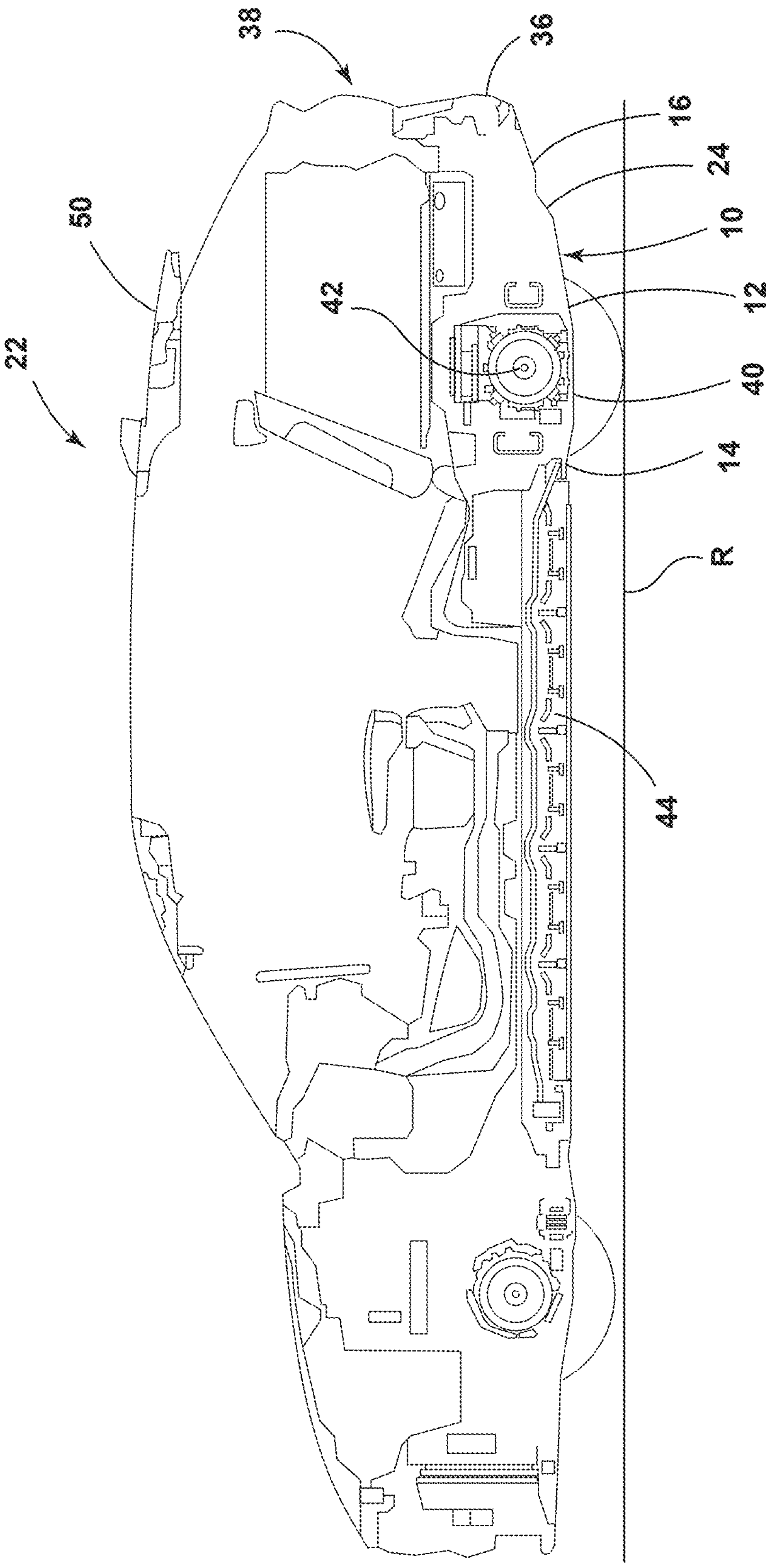
FIG. 2 is a side schematic view of a vehicle with a diffuser shield structured according to an aspect of the disclosure without an airflow management device.
Figure 3:
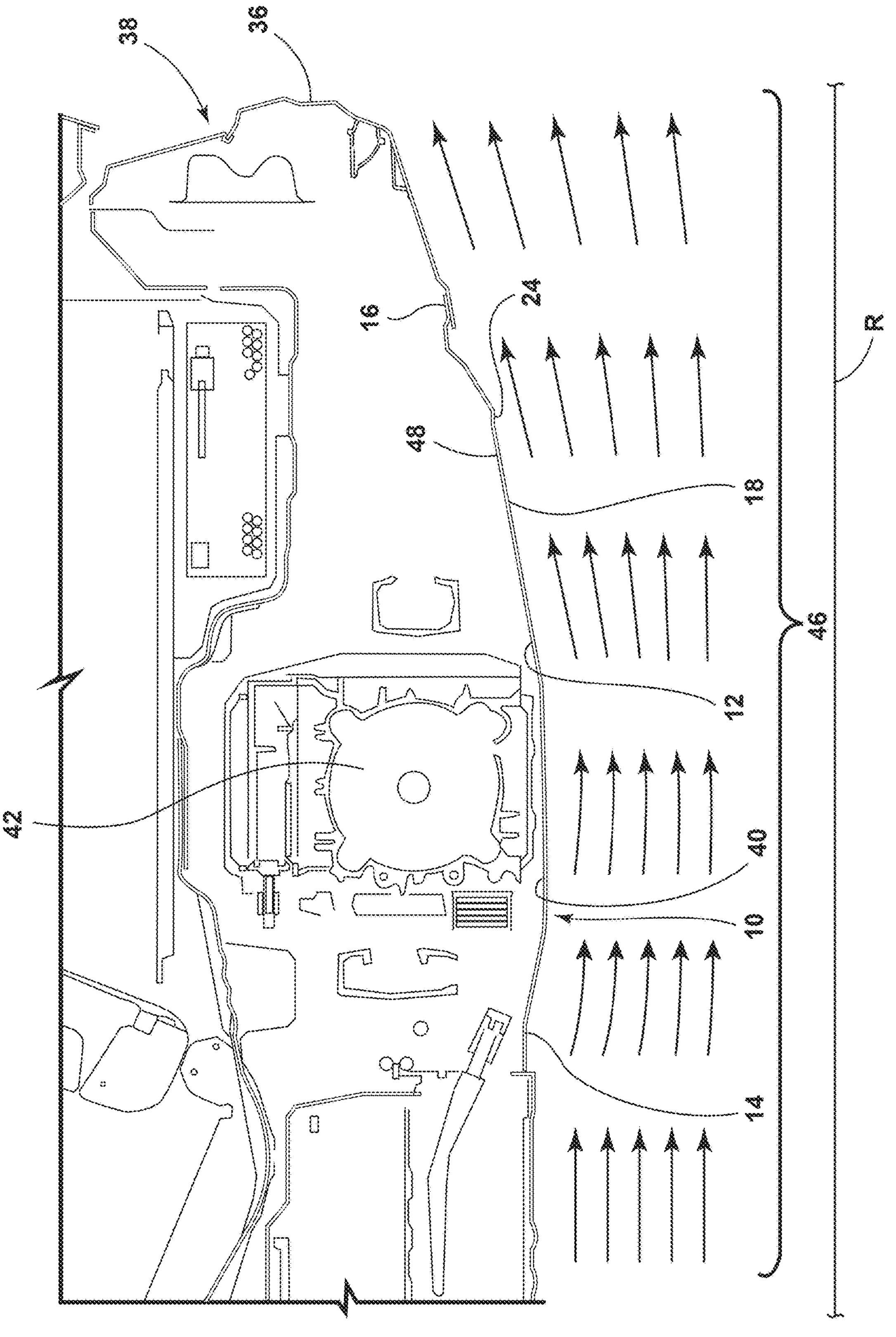
FIG. 3 is a detail view of the diffuser shield structure of FIG. 2 showing an air flow path beneath the vehicle.

In the vehicle shown in FIGS. 2 and 3, in which the above-described protrusions 26 are removed for illustration, the geometry of the body 12 of the diffuser shield 10 is not completely flat. In particular, the body 12 includes a central dip 40 between the leading end 14 and the surface transition 24. In the particular example of vehicle 22 shown in FIGS. 1-3, the vehicle 22 can be a battery electric vehicle ("BEV"), where the central dip 40 is present to accommodate the presence of the rear motor 42. In general, the presence of a large battery 44 with a flat lower surface that defines a part of the underbody 20. This vehicle architecture leads to the underbody 20 in general of such a vehicle 22 being more flat than traditional internal combustion engine ("ICE") vehicles. This results in the air flow 46 moving under the vehicle staying more "attached" along the entire length of the vehicle 22. As a result, the air flow 46 becomes more sensitive to the shapes, angles, and transitions on the diffuser shield 10. In particular, the change in the cross-sectional area reduction of the space between the underbody 20 and the road surface R causes an acceleration of the air flow 46 when moving past the dip 40 in the diffuser 10, body 12, as shown in FIG. 3.

Figure 4:
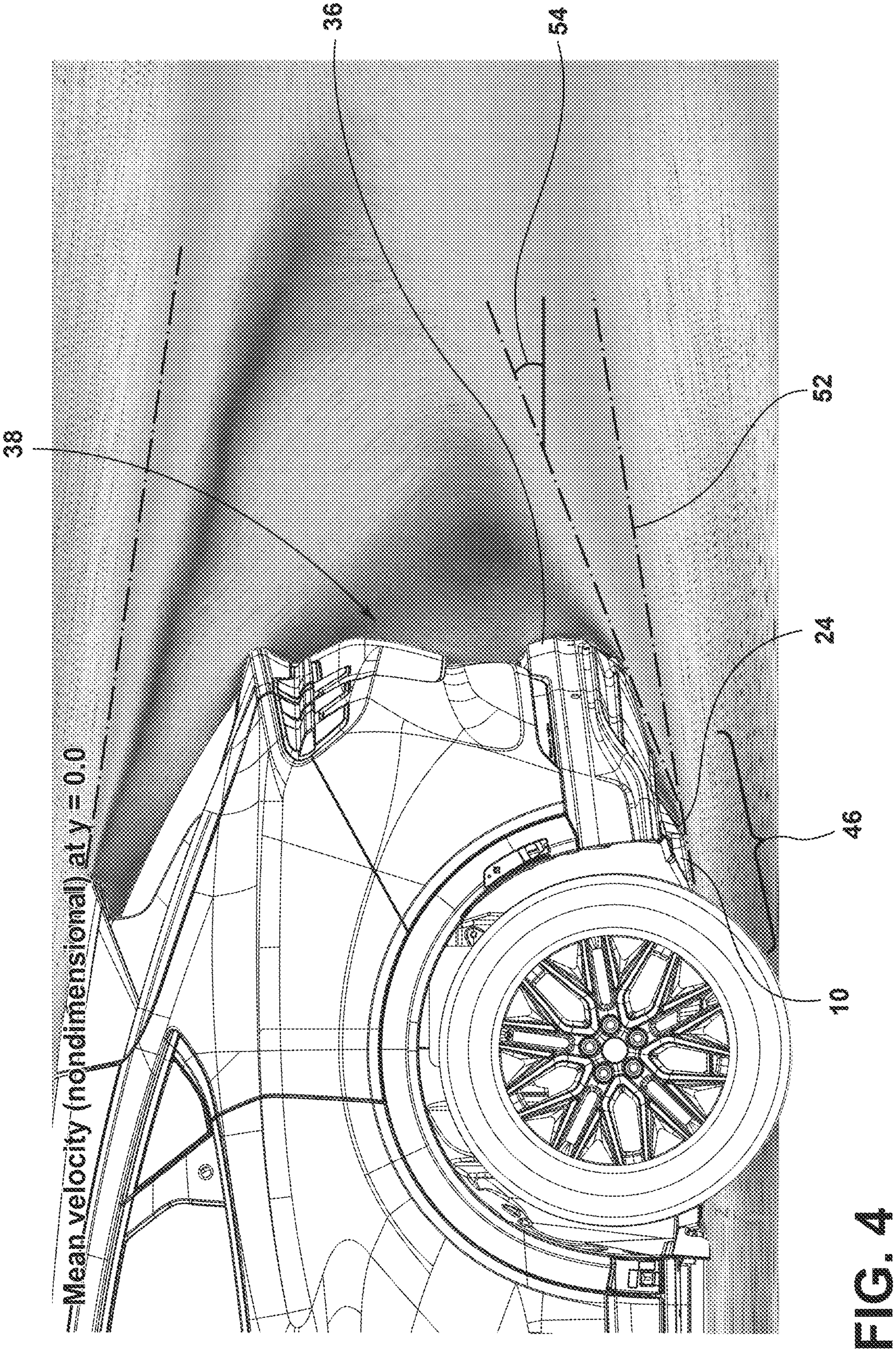
FIG. 4 is a schematic view of a vehicle wake structure resulting from the diffuser shield structure of FIGS. 2 and 3.

Toward the trailing end 16 of the diffuser shield 10, the major surface 18 of the body 12 slopes gradually upward after then central dip 40 before reaching the above-mentioned surface transition 24. The upward slope 48 is generally present to accommodate the motor 42 position, as discussed above, while the surface transition 24 leads to additional surface geometry that extends upwardly toward the lower inside edge of the bumper 36. Both the surface geometry of the major surface 18 between the surface transition 24 and the trailing end 16 are configured to achieve a desired height of the bumper 36, as well as a desired departure angle of the vehicle 22. From an airflow standpoint, the resulting expansion of the distance between the major surface 18 and the road surface R, causes the air flow 46 to drop in pressure, while accelerating. As shown in FIG. 4, this condition causes the air flow 46 from the underbody 20 to join the remaining vehicle wake, including from the roof 50, in an aerodynamically unbalanced manner, resulting in an unstable wake and increased drag.

Figure 5:
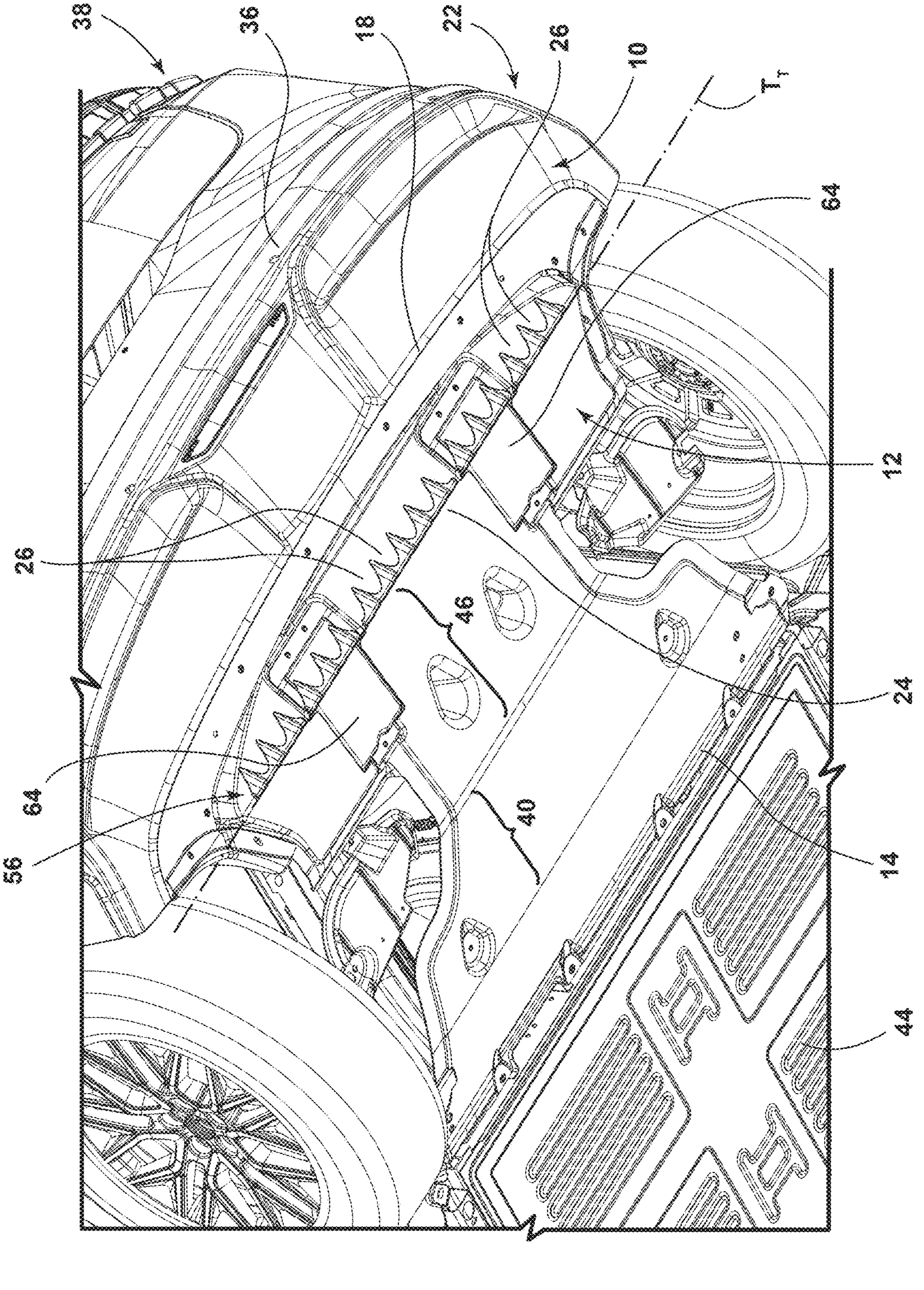
FIG. 5 is a bottom perspective detail view of area V, indicated in FIG. 1.
Figure 6:
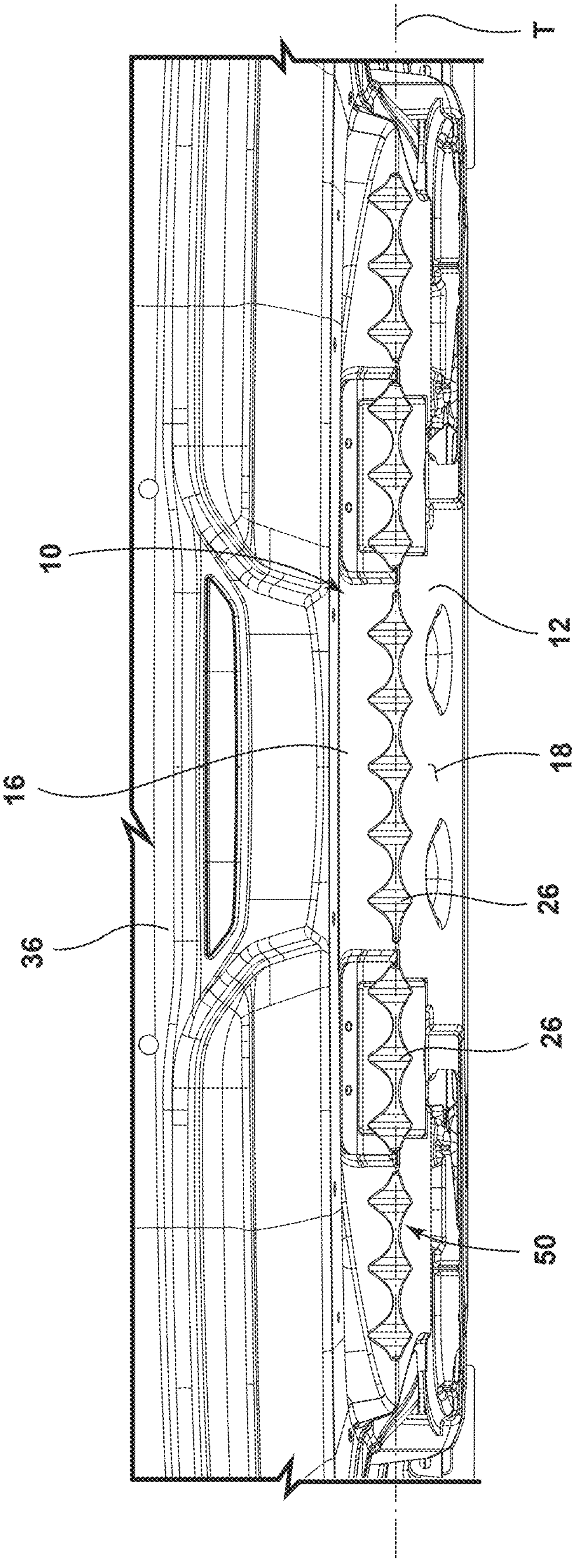
FIG. 6 is a rear detail view showing the diffuser shield with an airflow management structure according to the present disclosure.
Figure 7:
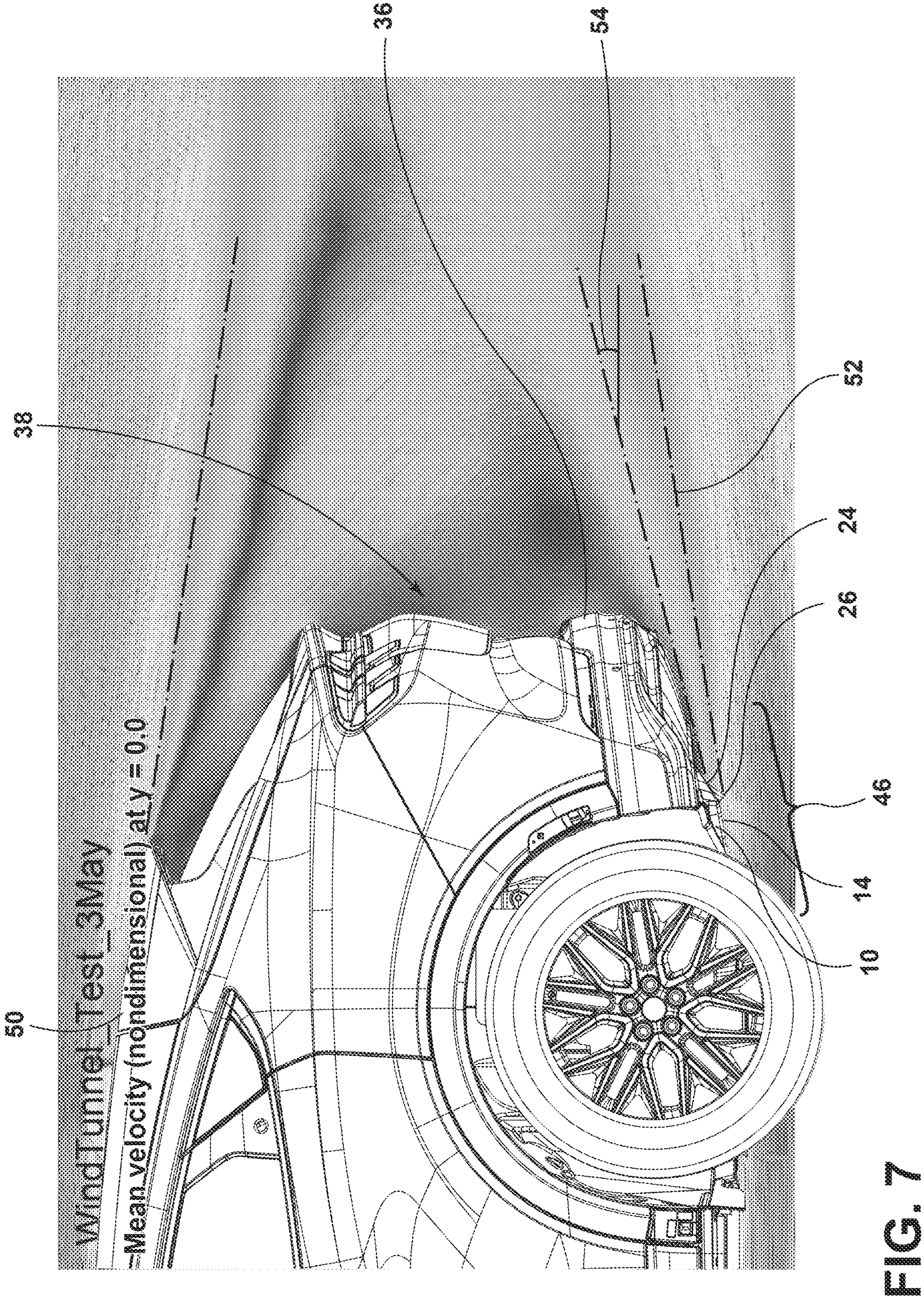
FIG. 7 is a is a schematic view of a vehicle wake structure resulting from the diffuser shield with the airflow management structure of FIGS. 5 and 6.

Turning to FIG. 5-7, the above-described protrusions 26 work to manage the air flow 46 over the diffuser 10 from the surface transition 24 toward and past the rear 38 of the vehicle 22. In one aspect, the protrusions 26 are arranged to work collectively as a set to manage the air flow 46 such that they may operate as a unit airflow management device, which may be referred to as a trip 56. In this manner, the trip 56 may be referred to as "porous" in that at least a portion of the adjacent air flow 46 moves through the structure (i.e., between the protrusions 26). The porous trip 56 works by addressing the above-described issues of the vehicle 22 shape that otherwise contribute to an unbalanced wake. In one aspect, the leading faces 28 of the protrusions 26 are flat, which increases the static pressure of the air flow 46 directly in front of the porous strip 56 over the major surface 18. This increased static pressure reduces the rate of deceleration of the air flow 46 into the wake (i.e. the air flow 46 enters the area behind the porous trip 56 at a higher velocity). Downstream of the faces 28, the geometry of the trailing portions 32 takes advantage of the local sensitivity of the air flow 46 to detach the air flow 46 from the underbody 20 at an earlier point, which lowers the angle 54 of the boundary layer 52 to better balance the air flow 46 with the wake shedding from the roof 50, which contributes to lift stability.

Figure 8A:
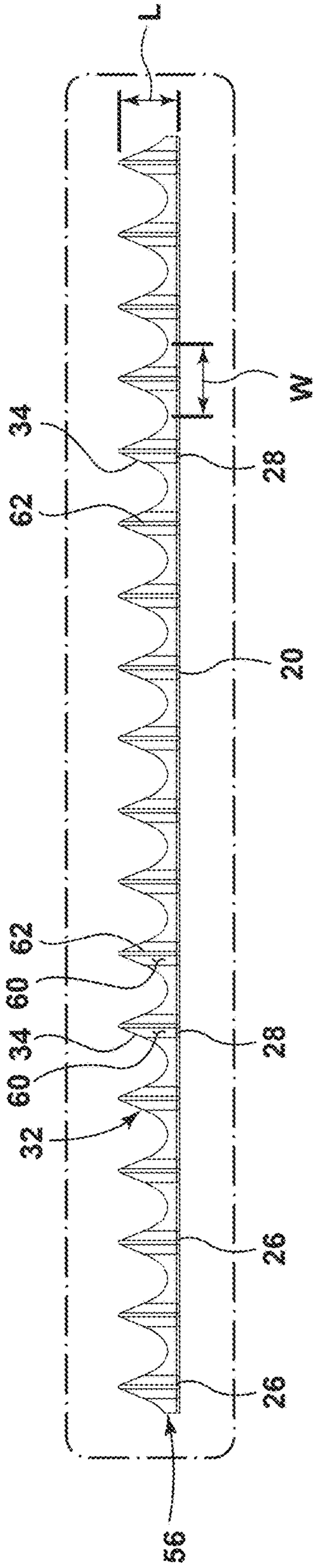
FIGS. 8A,8B, and 8C are top, front, and side detail views of the airflow management structure of FIGS. 5 and 6.
Figure 8B:
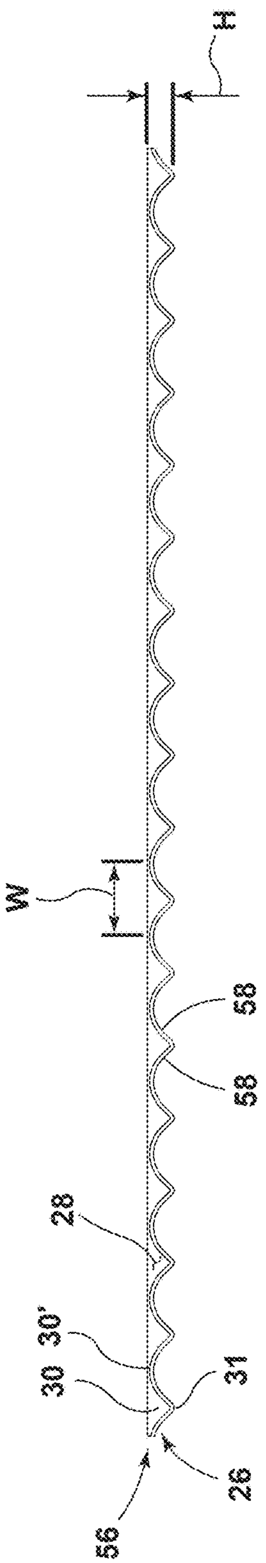
Figure 8C:
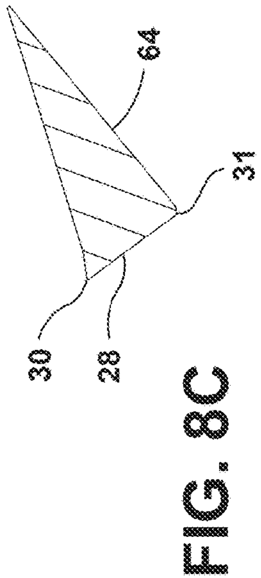

As can be appreciated, the geometry of the porous trip 56, in part, is selected to result in the desired interaction with the air flow 46 given the location of the porous trip 56 with respect to the underbody 20. As mentioned above, surface transition 24 is positioned below the trailing end 16 with the major surface 18 angling upward therebetween to induce the angle 54 of boundary layer 52 shown in FIG. 4. In this manner, the heights H (FIG. 8B) of the protrusions 26 can be such that at least the peaks 31 of the protrusions 26 extend into the boundary layer 52. In one implementation, the protrusions 26 can have heights of about 20 mm (+/−5%). In this manner, the plurality of protrusions 26 have at least portions of the leading faces 28 within the air flow 46 to collectively direct the boundary layer 52 away from the major surface 18 of the body 12 as the air flow 46 moves toward the trailing end 16 and rearward of the vehicle 22 (FIG. 7). As shown in FIG. 8B The respective bases 30 of the leading faces 28 can intersect to define a continuous lower face portion 30' adjacent the major surface 18, which may help joint the geometry of the successive protrusions 26 extending across the axis T and help influence the air flow 46 pressure and separation, as discussed above. As also shown, the protrusions 26 define respective widths W along the axis T, which can be about 60 mm, to achieve a desired surface area for causing the above-described pressure increase upstream of the porous trip 56. As further shown, the leading face 28 of each of the plurality of protrusions 26 can define opposite outer edges 58 extending from the base 30 to the peak 31. In one implementation, the outer edges 58 can be concave and can extend continuously between adjacent peaks 31 in respective successive protrusions 26 so as to define a scalloped profile extending through the plurality of protrusions 26. This profile can allow portions of the air flow 46 to move through the structure of the porous trip 56 and along the trailing portions 32, as mentioned above.

The geometry of the outer edges 58 can also influence the geometry of the trailing portions 32 and, accordingly, the interaction of the air flow 46 therewith. In particular, the trailing portion 32 of each of the plurality of protrusions 26 can define a concave surface 60 extending rearwardly from each of the opposite outer edges 58. This shape can influence the structure of the air flow 46 exiting the porous trip 56, as discussed above, including the wavelength and direction of the generated eddies, which prevent re-attachment of the air flow 46 to the major surface 18 downstream of the porous trip 56. As depicted, the trailing portions 32 are generally defined by rearward extrusions of the leading faces 28 of the protrusions 26. In this manner, the angle of the leading faces 28 with respect to the major surface 18, as well as the extrusion angle influences the shape of the intersection profile 34. In the present example, the trailing portions 32 are not normal to the front faces 28 but are angled such that the ridges 62 that extend from the peaks 31 are positioned at about 85° relative to the front faces 28. This positioning, along with the shape of the outer edges 58 results in the intersection profiles 34 of the protrusions 26 being parabolic, as defined by an intersection between each concave surface 60 and the major surface 18 of the body 12. This geometry can also define the respective lengths L of the protrusions 26 at the points along the intersection profile 34 at the ridges 62 of the protrusions 26. In the present implementation the lengths L can be about 55 mm (+/−5%). As discussed above, by way of the described geometry, the plurality of protrusions 26 can collectively direct the boundary layer 52 away from the major surface 18 of the body 12 and can cause the air flow 46 to enter the vehicle wake at a lower angle 54 than without the porous trip 56, as can be seen by comparison of the angle 54 between FIGS. 4 and 7. As discussed above, the vehicle 22 underbody 20 geometry is such that an energy of an air flow 46 over the major surface 18 would tend (i.e., without the porous trip 56 being present) to increase between the leading end 14 and the surface transition 24. The leading faces 28 of the plurality of protrusions 26 can reduce the air flow 46 energy moving toward the trailing end 16. The trailing portions 32 extend rearwardly and interact with the intersection profiles 34 to collectively produce turbulent eddies within the air flow 46 that are directed away from the major surface 18, specifically in that they prevent reattachment of the air flow 46, as redirected by the leading faces 28.

The eddies introduced by the protrusion 26 geometry are generally turbulent and introduce a specific localized energy content to the air flow 46 that facilitates redistribution of the energy content within the wake, overall. This energy redistribution results in moving energy away from much larger wake structures that dominate the total drag of the vehicle 22 to reduce the overall drag. The geometry of the porous trip 56 can be adjusted within the framework discussed above for strategic targeting of turbulent length scales to excite within the wake structure leading to a net drag reduction without driving aggressive shear layers, which is a consequence of using solid structures, such as gurney flaps or the like. Additionally, the protrusions 26 are scaled and designed according to both global and local geometric features of the vehicle and may be adjusted (i.e., in the length L, width W, and height H of the protrusions 26, as well as in the shape of the outer edges 58) for geometric differences in the associated diffuser shield 10. Notably, the present porous trip 56 differs from a gurney flap or the incorporation of vortex generators in that there is no solid cross section; rather, the porous trip 56 incorporates multiple successive ones of the above-described protrusions 26, which are scaled to the wake of the particular vehicle 22. Again, this geometry creates high frequency small wavelength eddies instead of one large vortex, which would induce a distinct separation point and high velocity gradients. The porous trip 56 creates small wavelength vortices, but those vortices are structured such that they do not attach the air flow 46 to the diffuser shield 10. Rather, the vortex structures counter the effect of larger wavelength, high drag vortices natural to the wake structure of an automotive vehicle 22.

Figure 9:
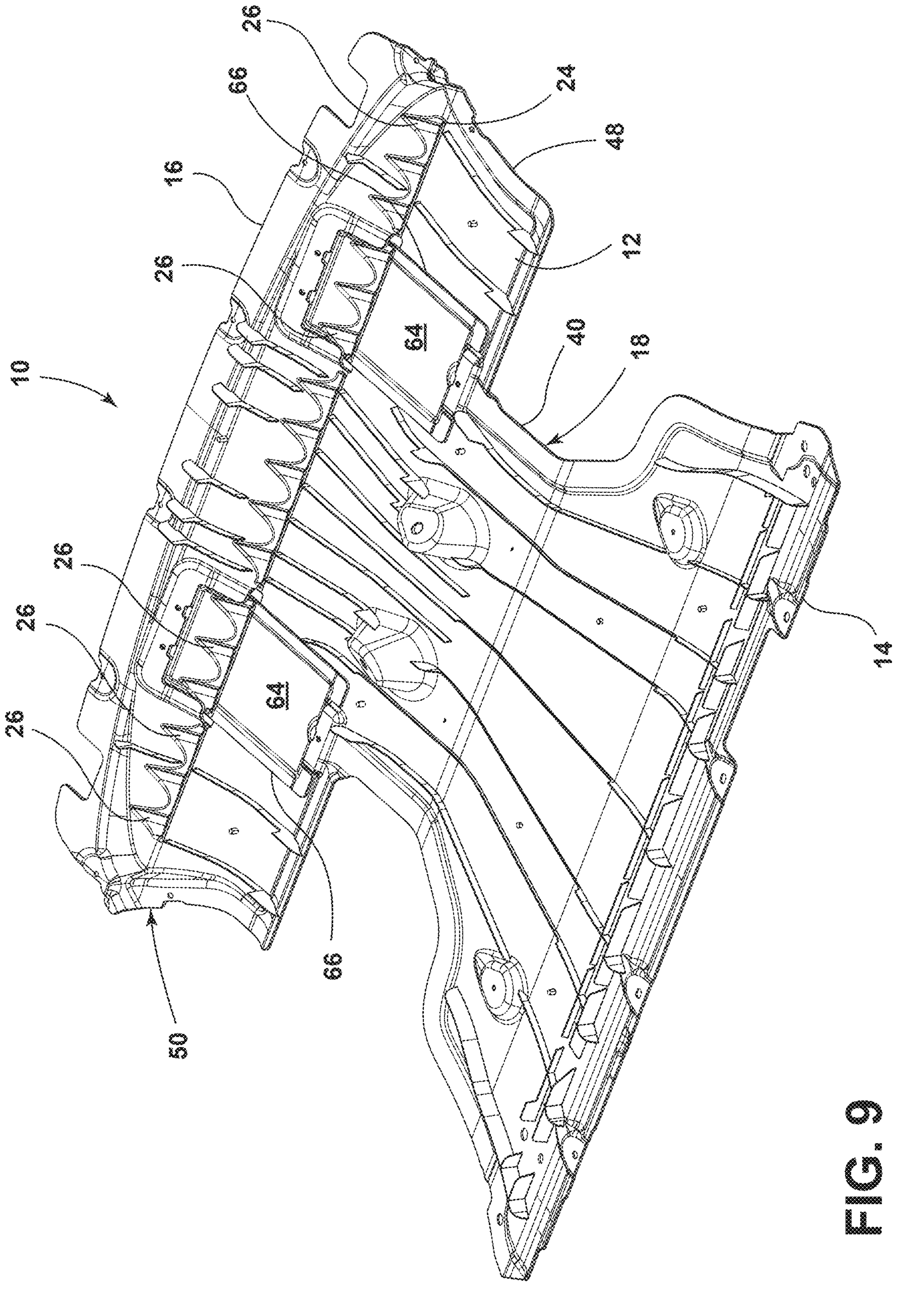
FIG. 9 is a top perspective view of a diffuser shield including the airflow management structure.

In the implementation of the porous trip 56 shown in FIGS. 1 and 5-9, at least some of the protrusions 26 are molded into the diffuser shield 10 with the body 12, as particularly shown in the interior view of diffuser shield 10 shown in FIG. 9. This construction can result in smoother transitions between the major surface 18 and the protrusion 26 geometry to better achieve the desired air flow 46 characteristics. As shown, the diffuser shield 10 includes inserts 64 that are positioned within alignment openings 66 after coupling of the diffuser shield 10. Some protrusions 26 within the overall structure of the porous trip 56 can be included in these inserts 64. Additionally, some of the protrusion 26 geometry may vary depending on the shape of the adjacent portions of major surface 18, with the peaks 31 of the protrusions 26 being generally vertically aligned.

In various alternative arrangements, shown in FIGS. 10A-10D, the porous trip 156 or 256 can be structured as an attachment that can be separately mounted to a diffuser shield 10 during or after assembly thereof with the associated vehicle. In this manner, the airflow management device for the vehicle 22 underbody 20 in the form of the depicted porous trip 156, 256 includes protrusions 126, 226 in a similar arrangement to those discussed above, with the protrusions 126, 226 being connected along the respective bases 130, 230, including along a common lower face portion 130', 230'. With specific reference to porous trip 156 in FIGS. 10A and 10B, each protrusion 126 has a leading face 128 extending away from a base 130 and narrowing to a peak 131 positioned away from the base 130 at a height H and a trailing portion 132 extending from the leading face 128 to a trailing profile 134 that is generally similar to the intersection profile 34 of the protrusions 26 discussed above, and tapers inwardly from the base 130 of the leading face 128 to a trailing point 168 with a ridge 162 extending from the peak 131 of the leading face 128 to the trailing point 168. The respective bases 130 of the leading faces 128 intersect to define a continuous lower face portion 130' that is positionable adjacent the major surface of the associated diffuser shield. The porous trip attachment 156 can include a plurality of tabs 170 with holes 172 therein to receive fasteners for coupling of the porous trip 156 to the diffuser shield.

Figures 10A, 10B, 10C, 10D:
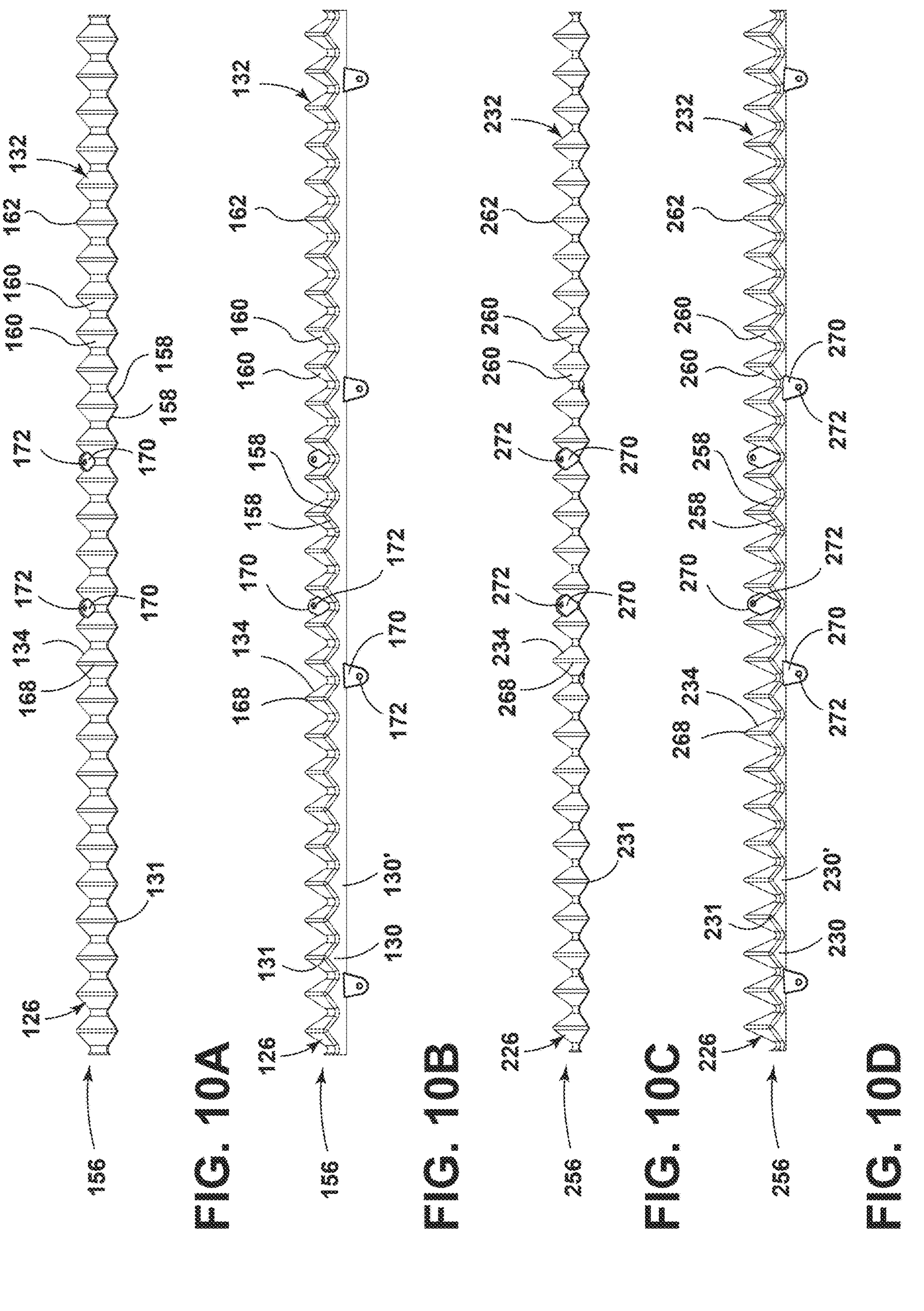
FIGS. 10A, 10B, 10C, and 10D are perspective and top views of alternative airflow management structures according to aspects of the disclosure.

In one aspect, an underbody attachment can be constructed to have protrusions similar to protrusions 26 of the above-described porous trip 56, particularly with the described concave outer edges 58. In the alternative arrangement of FIGS. 10A and 10B, the outer edges 158 can be generally straight. The trailing portions 132 can extend from the leading face 128 to the trailing profile 134 with the trailing profile 134 tapering inwardly from the base 130 of the leading face 128 to the trailing point 168 with ridge 162 extending from the peak 131 of the leading face 128 to the trailing point 168. The trailing portion 132 can define flat, angled surfaces 160 extending rearwardly from each of the opposite outer edges 158. The intersection profile 134 can be generally triangular. In the implementation of FIG. 10A, the heights H of the protrusions 126 can be about 28 mm, with the widths W being about 37 mm, and the lengths L being about 53 mm. The implementation of the porous trip 256 shown in FIGS. 10B and 10C can be similar to the porous trip 156 just described, with changes to at least some of the dimensions. In particular, the heights H of the protrusions 226 can be about 20 mm, with the widths W being about 41 mm, and the lengths L being about 53 mm.

It is to be understood that variations and modifications can be made on the aforementioned structure without departing from the concepts of the present disclosure, and further it is to be understood that such concepts are intended to be covered by the following claims unless these claims by their language expressly state otherwise.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A vehicle underbody diffuser shield, comprising:

a body having a leading end and a trailing end, a major surface defining a portion of an underbody of the vehicle extending between the leading end and the trailing end, the major surface defining a surface transition between the leading end and the trailing end such that the surface transition is positioned below the trailing end; and a plurality of protrusions extending away from the major surface and arranged along a transverse axis of the body located between the surface transition and the trailing end, each of the plurality of protrusions having:

a leading face extending away from the body at base aligned with the surface transition and narrowing to a peak positioned away from the major surface at a height of the protrusion;

a trailing portion extending from the leading face toward the trailing end, the trailing portion intersecting the major surface along an intersection profile that tapers inwardly from the base of the leading face to a trailing point disposed toward the trailing end of the body.

2. The diffuser shield of claim 1, wherein the respective bases of the leading faces intersect to define a continuous lower face portion adjacent the major surface.

3. The diffuser shield of claim 1, wherein the leading face of each of the plurality of protrusions defines opposite outer edges extending from the base to the peak, the outer edges being concave.

4. The diffuser shield of claim 3, wherein the opposite outer edges extend continuously between adjacent peaks in respective successive protrusions so as to define a scalloped profile extending through the plurality of protrusions.

5. The diffuser shield of claim 3, wherein:

the trailing portion of each of the plurality of protrusions defines a concave surface extending rearwardly from each of the opposite outer edges; and the intersection profile is parabolic along a portion defined by an intersection between each concave surface and the major surface of the body.

6. The diffuser shield of claim 1, wherein:

the surface transition induces a boundary layer separation of air flow over the major surface in a direction from the leading end to the trailing end; and the height of each of the plurality of protrusions is such that at least the peaks of the protrusions extend into the boundary layer.

7. The diffuser shield of claim 6, wherein the plurality of protrusions collectively direct the boundary layer away from the major surface of the body toward the trailing end.

8. The diffuser shield of claim 1, wherein:

the surface transition is further positioned below the leading end such that an energy of an air flow over the major surface increases between the leading end and the surface transition; and the leading faces of the plurality of protrusions reduce the air flow energy moving toward the trailing end.

9. The diffuser shield of claim 8, wherein the trailing portions extend rearwardly and interact with the intersection profiles to collectively produce turbulent eddies within the air flow that are directed away from the major surface.

10. The diffuser shield of claim 1, wherein at least some of the protrusions are molded into the diffuser shield with the body.

11. An airflow management device for a vehicle underbody, comprising;

a body defining a major surface; and a plurality of protrusions, each including:

a leading face extending away from a base and narrowing to a peak positioned away from the major surface at a height of the protrusion; and a trailing portion extending from the leading face to a trailing profile that tapers inwardly from the base of the leading face to a trailing point with a ridge extending from the peak of the leading face to the trailing point;

wherein the respective bases of the leading faces intersect to define a continuous lower face portion adjacent the major surface.

12. The airflow management device of claim 11, wherein the device is coupled with a diffuser shield body for an automobile including a body having a leading end and a trailing end, a major surface defining a portion of an underbody of the vehicle extending between the leading end and the trailing end, the major surface defining surface transition between the leading end and the trailing end such that the surface transition is positioned below the trailing end with the protrusions extending away from the major surface and arranged along a transverse axis of the body located between the surface transition and the trailing end.

13. The airflow management device of claim 12, wherein:

the surface transition induces a boundary layer separation of air flow over the major surface in a direction from the leading end to the trailing end; and the height of each of the plurality of protrusions is such that at least the peaks of the protrusions extend into the boundary layer.

14. The airflow management device of claim 13, wherein the plurality of protrusions collectively direct the boundary layer away from the major surface of the body toward the trailing end.

15. The airflow management device of claim 12, wherein:

the surface transition is further positioned below the leading end such that an energy of an air flow over the major surface increases between the leading end and the surface transition;

the leading faces of the plurality of protrusions reduce the air flow energy moving toward the trailing end; and the trailing portions extend rearwardly and interact with the intersection profiles to collectively produce turbulent eddies within the air flow that are directed away from the major surface.

16. The airflow management device of claim 12, wherein at least some of the protrusions are molded into the diffuser shield with the body.

17. The airflow management device of claim 12, wherein the leading face of each of the plurality of protrusions defines opposite outer edges extending from the base to the peak, the outer edges being concave.

18. The airflow management device of claim 17, wherein the opposite outer edges extend continuously between adjacent peaks in respective successive protrusions so as to define a scalloped profile extending through the plurality of protrusions.

19. The airflow management device of claim 18, wherein:

the trailing portion of each of the plurality of protrusions defines a concave surface extending rearwardly from each of the opposite outer edges; and the intersection profile is parabolic along a portion defined by each concave surface.

20. An airflow management device for a vehicle underbody, comprising;

a body defining a major surface; and a plurality of protrusions, each including:

a leading face extending away from a base and narrowing to a peak positioned away from the major surface at a height of the protrusion and defining opposite outer edges extending from the base to the peak, the outer edges being concave; and a trailing portion extending from the leading face to a trailing profile that tapers inwardly from the base of the leading face to a trailing point with a ridge extending from the peak of the leading face to the trailing point, the trailing portion defining a concave surface extending rearwardly from each of the opposite outer edges, the intersection profile being parabolic along a portion defined by an intersection between each concave surface and the major surface of the body.

* * * * *